United States Patent
Kimchi et al.

(10) Patent No.: US 11,749,122 B1
(45) Date of Patent: Sep. 5, 2023

(54) MULTI-DEVICE REDUNDANT FLIGHT CONTROLLER

(71) Applicant: Amazon Technologies, Inc., Seattle, WA (US)

(72) Inventors: Gur Kimchi, Seattle, WA (US); Michael Daniel Piedmonte, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 464 days.

(21) Appl. No.: 16/712,958

(22) Filed: Dec. 12, 2019

(51) Int. Cl.
   *G05D 1/06* (2006.01)
   *B64C 39/02* (2006.01)
   *G08G 5/00* (2006.01)

(52) U.S. Cl.
   CPC ......... *G08G 5/0039* (2013.01); *B64C 39/024* (2013.01); *G05D 1/0676* (2013.01); *B64C 2201/12* (2013.01); *B64C 2201/14* (2013.01)

(58) Field of Classification Search
   None
   See application file for complete search history.

(56) References Cited

U.S. PATENT DOCUMENTS

| | | | | |
|---|---|---|---|---|
| 7,877,627 | B1 * | 1/2011 | Freydel | G06F 11/1633 714/11 |
| 10,025,307 | B2 * | 7/2018 | Downey | G05D 1/0055 |
| 10,375,359 | B1 * | 8/2019 | Beard | G06T 7/74 |
| 2008/0205416 | A1 | 8/2008 | DeChiara | |
| 2013/0076120 | A1 | 3/2013 | Wagner et al. | |
| 2013/0311009 | A1 * | 11/2013 | McAndrew | G08G 5/0039 701/3 |
| 2014/0258556 | A1 * | 9/2014 | Ratica | G06F 9/4451 709/240 |
| 2015/0225081 | A1 * | 8/2015 | Stabler | G05B 23/0286 701/3 |
| 2015/0353192 | A1 * | 12/2015 | Morrison | B64D 31/06 244/17.23 |
| 2016/0114882 | A1 | 4/2016 | Lin et al. | |
| 2016/0187882 | A1 * | 6/2016 | Downey | G05D 1/0077 701/3 |
| 2016/0200421 | A1 | 7/2016 | Morrison | |
| 2016/0264150 | A1 * | 9/2016 | Freiwald | G05B 9/03 |
| 2016/0360555 | A1 | 12/2016 | Berezowski et al. | |

(Continued)

FOREIGN PATENT DOCUMENTS

| | | | | |
|---|---|---|---|---|
| CN | 108107910 A | * | 6/2018 | G05D 1/101 |
| EP | 3043264 A1 | * | 7/2016 | G05D 1/0011 |

(Continued)

*Primary Examiner* — Jelani A Smith
*Assistant Examiner* — Jacob Daniel Underbakke
(74) *Attorney, Agent, or Firm* — Athorus, PLLC

(57) ABSTRACT

Described is a system and apparatus that provides redundant flight control for an aerial vehicle without the use of independent and dedicated redundant flight control boards and processors. Additional compute resources available on processors of other device boards of an aerial vehicle may be used to execute redundant flight control programs. The device boards and/or those redundant flight control programs monitor the operability of the various flight controllers. If any of the flight controllers is determined to be inoperable, one of the redundant flight control programs assumes the role of the inoperable controller.

19 Claims, 9 Drawing Sheets

(56) References Cited

U.S. PATENT DOCUMENTS

2017/0277607 A1* 9/2017 Samii .................. G06F 11/2033
2018/0349235 A1* 12/2018 Freydel ................ G06F 11/182
2019/0233087 A1* 8/2019 Avritch ................ G05D 1/0088
2019/0260768 A1* 8/2019 Mestha ............... H04L 63/1416

FOREIGN PATENT DOCUMENTS

WO    WO-2019122926 A1 *  6/2019  ............. B64C 29/00
WO    WO-2019211875 A1 * 11/2019

* cited by examiner

MULTI-DEVICE REDUNDANT FLIGHT CONTROLLER

BACKGROUND

Many aerial vehicles utilize one or more forms of redundant flight control systems to ensure the safe flight of the aerial vehicle. For example, many commercial airplanes utilize a Fly-By-Wire system that includes triple redundancy for all hardware resources: computing system, electrical power, hydraulic power, and communication. In this system, the flight control system is also redundant and includes three primary flight control computers, each flight control computer including an independent processor that computes flight control instructions that control the motors and/or adjustable surfaces to aerially navigate the aerial vehicle.

Existing redundant flight control systems often utilize three flight control computers, each of which includes an independent processor, so that the system is robust to a failure of one of the three flight control computers and is still able to safely navigate with a majority of the remaining flight control computers. Some systems have additional redundancy through the addition of additional independent processors. For example, some flight control systems may utilize more than three flight control computers, each having an independent processor. Other systems utilize multiple independent processors within each of the three flight control computers.

While additional independent processors increase the redundancy of flight control systems, they also increase aerial vehicle weight, require more space on the aerial vehicle, and consume more power. While not much a concern for larger aerial vehicles, such as commercial airplanes, for smaller aerial vehicles, such as unmanned aerial vehicles ("UAV") that utilize electrical power, these increases have negative affects by, for example, reducing operational time, and decreasing the amount of additional payload that can be lifted by the aerial vehicle, etc.

DETAILED DESCRIPTION

Figure 1A:
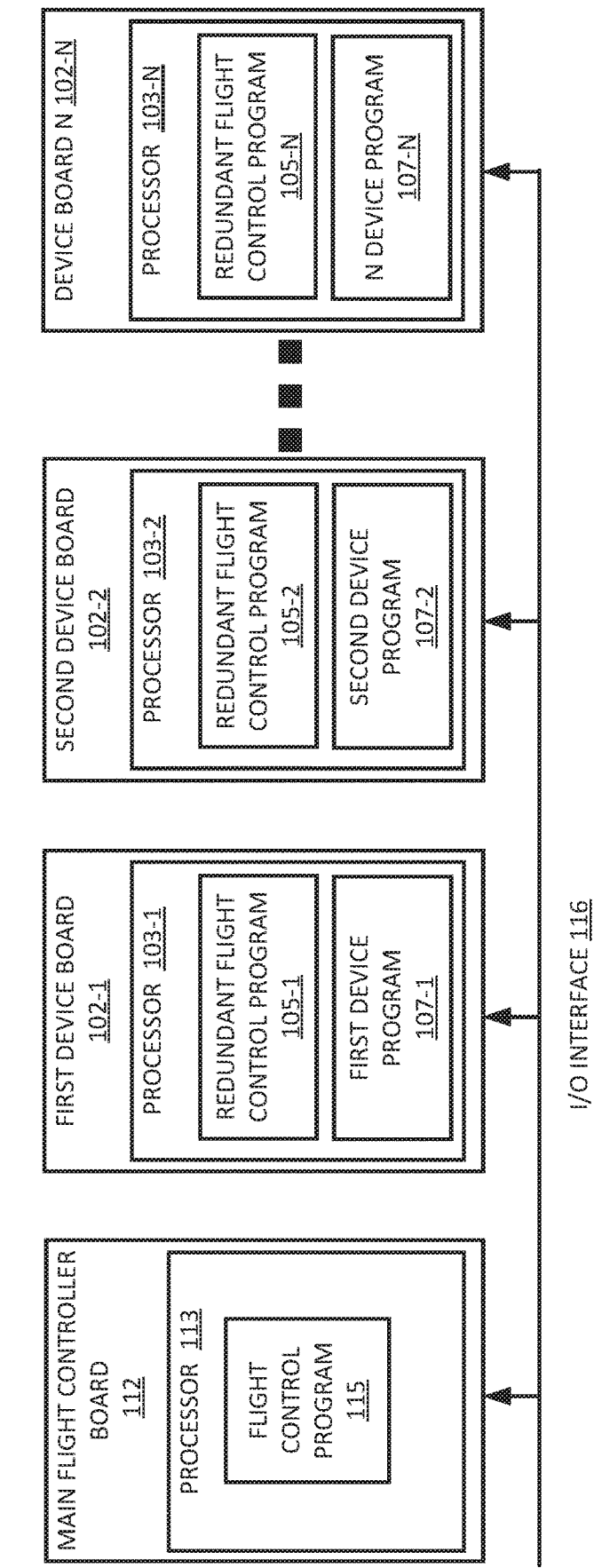
FIG. 1A is a block diagram of an input/output interface, main flight controller, and multiple device boards, in accordance with described implementations.

In addition to providing redundancy for flight control computers (e.g., the main flight controller, the navigational system, etc.) in a flight control system, this disclosure describes a configuration in which additional compute resources on processors of other device boards of an aerial vehicle may be used by the flight control program, and/or other device programs. As described, each control board of different controllers on an aerial vehicle include a processor and one or more peripherals. Many of these processors have additional compute capacity that is not utilized by the device program designed for control board operation that executes on the processor. To provide redundant and/or backup flight control programs, processors on other control boards connected to the input/output interface, such as the controller area network ("CAN") bus, may be pre-loaded with redundant flight control programs and available to initiate operation and fill the role of any controller, processor, system, etc. of a flight control system (e.g., the main flight controller, the navigational system, etc.) in the event that any such controller, processor, system, etc. becomes inoperable or unresponsive. For example, each control board (or processor) on the CAN bus may monitor the controllers, processors, systems, etc. for a failure and, if such a failure is detected, one of the control boards (or processors) may initiate the pre-loaded redundant flight control program and assume the role of the controller, processor, or system experiencing the failure so that the aerial vehicle can continue safe aerial navigation. In some implementations, as discussed below, the redundant flight control program may be configured to facilitate a safe emergency landing of the aerial vehicle. In other implementations, the redundant flight control program is configured to assume full flight control processes so that the device board on which the redundant flight control program is operating, and the redundant flight control program is fully functional as the flight controller. For simplicity of discussion, although the described implementations are primarily described in connection with providing redundancy for the main flight controller, the disclosed implementations are equally applicable to providing redundancy for any controller, processor, system, etc. of a flight control system, such as the main flight controller, the navigational system (e.g., inertial measurement unit, etc.), etc.

In still further implementations, the redundant flight control programs pre-loaded onto the processors of other device boards may operate during normal flight operation, independently generating flight control instructions based on received inputs. Those flight control instructions may be compared with flight control instructions received from the active flight controller to ensure that the active flight controller is properly functioning. If a difference determined from the comparison exceeds an expected tolerance range, the redundant flight control program may send an alert notification to the other redundant flight control programs operating on other device boards of the aerial vehicle. If a threshold number of the redundant flight control programs report alert notifications, the active flight controller may be disabled, or commands ignored and one of the redundant flight control programs executing on one of the device boards may assume the role of active flight controller for the aerial vehicle.

In still other implementations, there may be no dedicated main flight controller board. In such an implementation, at startup of the aerial vehicle, one of the redundant flight controller programs executing on one of the device boards may assume the role of active flight controller for that flight of the aerial vehicle. The other redundant flight control programs may then function as discussed above and confirm the validity of the flight instructions generated by the redundant flight control program that is operating as the active flight controller.

By providing additional redundancy of flight control programs executing on processors of other device boards, the overall flight control system is more robust, yet there is no added weight and minimal increase in power consumption by using processors that are already necessary and included on device boards of the aerial vehicle. This configuration provides a technical improvement over traditional systems that either did not have redundancy within each flight control computer of a flight control system or used dedicated redundant flight control boards with corresponding flight control programs for each redundant flight controller.

FIG. 1A is a block diagram 100 of an input/output interface ("I/O interface"), main flight controller, and multiple device boards, all interconnected and communicating via the I/O interface, in accordance with described implementations. In many configurations, the I/O interface may be a CAN bus. In other implementations, the I/O interface may be another form of communication channel utilized to enable communication and data exchange between each of the main flight controller 112 and the device boards 102. Likewise, in some implementations one of the controllers, such as the main flight controller, may be assigned as the bus master for controlling communication along the I/O interface 116. Likewise, each board that communicates via the I/O interface 116 may be assigned a priority, indicated by the device identifier or otherwise, and communications from boards having a higher priority will be transmitted over the I/O interface 116 before communications from other boards.

Any of a variety of boards may be connected to and communicate using the I/O interface. Example device boards 102 include but are not limited to electronic speed control ("ESC") boards, motor control boards, actuator/control surface control boards, ground detection board, magnetometer board, battery management board, power regulator board, inventory engagement mechanism board (aka package bay or payload board), flight data recorder board, navigation system board, angle of attack board, landing gear control board, etc.

For simplicity of discussion, the illustrated example includes a first device board 102-1, second device board 102-2 through device board N 102-N, indicating that any number and/or type of device board may be included in the aerial vehicle and communicating over the I/O interface.

The flight controller board 112, in this example, includes at least a dedicated processor 113 that executes a flight control program 115 and functions as the main flight controller for the aerial vehicle. In addition, each device board 102-1 through 102-N includes at least one dedicated processor. Likewise, each processor of each device board includes and executes the device program 107 for that device board and, in accordance with the described implementations, redundant flight control program 105. As discussed further below, the processors may include internal memory or cache that stores the device program 107 and/or the redundant flight control program 105.

In the illustrated example, the first device board 102-1 includes a processor 103-1 that maintains and executes first redundant flight control program 105-1 and first device program 107-1. The second device board 102-2 includes a processor 103-2 that maintains and executes second redundant flight control program 105-2 and second device program 107-2. Device board N 102-N includes a processor 103-N that maintains and executes an $N^{th}$ redundant flight control program 105-N and an $N^{th}$ device program 107-N. While the illustrated example shows that each of the device boards 102 maintain and execute a redundant flight control program, in other implementations fewer than all of the boards connected to the I/O interface 116 may include and/or execute a redundant flight control program. For example, in one implementation, only two of the device boards may include and/or execute redundant flight control programs. In another example, all of the device boards 102 may include a redundant flight control program but none of them may execute the redundant flight control program 105 unless the main flight control program 115 becomes inoperable. In still another example, some or all of the device boards 102 may include a redundant flight control program but only one (or more) may execute the redundant flight control program 105 to monitor the health and accuracy of the main flight control program 115. In still other examples, some or all of the device boards 102 may include the redundant flight control program and a defined number of the flight control programs may execute to monitor the health or operability of the main flight control program 115. In such an implementation, the device boards that execute the redundant flight control programs 105 may be, for example, randomly selected, selected based on a priority order (e.g., predetermined or dynamically established), selected based on available compute capacity, etc.

Regardless of the configuration, the device boards 102, whether they are executing the redundant flight control program 105 or not, may monitor for a health of the main flight control program 115. In one implementation, the main flight control program 115 may send at defined time intervals and through the I/O interface 116, a synchronization message that is received by each of the device boards 102 that are connected to and communicate through the I/O interface. In such an implementation, the device board 102 and/or the redundant flight control program, will utilize receipt of the synchronization message as confirmation that the flight controller 112 is operable. If the synchronization message is not received, it may be determined that the flight controller 112 is experiencing a failure condition. The present disclosure contemplates other implementations of monitoring the health of the flight controller 112 as well.

According to another implementation, the flight controller 112 may transmit flight control instructions to each of the device boards 102 according to a defined timing sequence (e.g., 100 Hz, 200 Hz, etc.). The device boards 102 can monitor the timing of the flight control instructions and if the flight control instructions are not received in accordance with the defined timing sequence, it can be determined by the device boards 102 that the flight controller 112 is experiencing a failure condition. For example, the device boards 102 may not receive flight control instructions (e.g., silence from the flight controller 112) for a period of time and if the period of time during which flight control instructions are not received exceeds a threshold (e.g., 50 ms, 100 ms, 150 ms, 200 ms, etc.), it may be determined that the flight controller 112 is experiencing a failure condition. Alternatively, the device boards 102 may receive flight control instructions at random timing intervals or at timing intervals that are not synchronized with the expected defined timing sequence of the flight controller 112. Accordingly, a failure condition of the flight controller 112 can be determined after a number of mis-timed flight control instructions exceeds a threshold value.

In the event that it is determined that the flight controller 112 is experiencing a failure condition, one of the device boards 102 may begin executing, with the processor 103 of that device board, the redundant flight control program 105, if it is not already executing, and transmit a change control notification indicating that the device board 102 is assuming the role as active flight controller and that flight control instructions will be sent by the redundant flight control program executing on the processor 103 of that device board. The other device boards, upon receiving the change control notification will begin following and receiving flight control instructions from the redundant flight control program 105 executing on the processor 103 of the board 102 that sent the change control notification. Alternatively, when a failure condition of the flight controller 112 is identified, a change of control confirmation may be determined before any of device boards 102 begins executing the redundant flight control program 105 and assumes the role as the active flight controller. The change of control confirmation may be in the form of an agreement and/or a consensus of the device boards 102 that one of the device boards 102 should assume the role of active flight controller from the flight controller 112. For example, once a failure condition of the flight controller 112 is determined by any of the device boards 102, an instruction or broadcast can be sent to each of the device boards 102 to poll the device boards 102 to ensure that there is an agreement and/or a consensus among the device boards 102 that one of the device boards 102 should assume responsibility over flight controls from the flight controller 112. According to certain aspects of the present disclosure, the change of control confirmation may include an agreement from all the device boards 102 that the flight controller 112 has experienced a failure condition and that one of the device boards 102 should assume the role as active flight controller. Alternatively, the change of control confirmation may include a simple majority or a super majority of the device boards 102 that the flight controller 112 is experiencing a failure condition and that one of the device boards 102 should assume the role as active flight controller. Subsequent to determining the change of control confirmation, a change of control notification will be sent by the redundant flight control program executing on the processor 103 of the device board 102 that has assumed the role of the active flight controller. Upon receiving the change control notification, all the device boards 102 will begin following and receiving flight control instructions from the redundant flight control program 105 executing on the processor 103 of the device board 102 that sent the change control notification and has assumed the role of active flight controller.

In the event that more than one device board 102 and/or redundant flight control program determines that the main flight controller 112 has become inoperable and transmits a change control notification, one of the device boards or redundant flight control program may be elected or determined to become the flight controller and assume the role of active flight controller. In one implementation, this election or determination may be done randomly, based on the device board that first sends the change control notification, based on the priority of the device board, based on the available compute capacity of the device board, and/or based on one or more other factors. The priority can determine which device board 102 is to assume the role of active flight controller in the event of a failure condition experienced by flight controller 112. For example, the device board 102 with the highest priority may be the first choice to assume the role of active flight controller. If the device board 102 with the highest priority is unable to assume the role of active flight controller, the device board 102 with the next highest priority may be selected to assume the role as active flight controller, and so on, until one of the device boards 102 is able to assume the role as active flight controller.

According to certain implementations, each device board 102 may be assigned a predetermined priority. Alternatively, each device board 102 can be dynamically assigned a priority based on a stage of flight the UAV is experiencing. For example, based on the stage of flight of the UAV, certain device boards 102 may be idle while other device boards 102 may be controlling critical aspects of flight. Accordingly, for each respective stage of flight, any idle device board 102 may be dynamically assigned the highest priority, and the device boards 102 controlling the more critical aspects of flight of flight may be dynamically assigned lower priorities. For example, during regular flight, a device board 102 controlling a payload and a device board controlling a landing gear 102 may be substantially idle. In such a stage of flight, the device board 102 controlling the payload and the device board 102 controlling the landing gear may be given the highest priorities.

In the described implementations, redundant flight control programs 105 may be loaded onto and operate independently on different processor cores of a multi-core processor or within different segments of a single core processor than those of the device program for the respective device board 102. For example, in some implementations, each processor 103 of the device boards 102 may include two or more processing cores. In such an example, the device program 107 of the device board may execute on a first core and the redundant flight control program may operate on a second core of the processor 103.

As described in more detail below, each processor executing redundant flight control program 105 receives an input that is also received by the flight control program 115, via the I/O interface 116, and independently computes a flight control instruction that should be executed by a motor or other control surface in response to the received input. For example, in implementations employing a CAN bus architecture, all the device boards 102 can access flight and navigational information including, for example, an anticipated flight plan, and the computed flight control instruction can be at least based in part on the anticipated flight plan. The redundant flight control program then compares the computed flight control instruction with a flight control instruction received from the main flight control computer (or from a redundant flight control computer that has assumed the responsibility of flight control) to determine if the difference is within an expected tolerance range. If the difference is within the expected tolerance range, it is confirmed that the active flight control program is operating as expected. If the difference is not within the expected tolerance range, it is determined that the active flight control program is not operating as expected. Alternatively or in addition, a rate of deviation of the comparison between the computed flight control instruction with a flight control instruction received from the main flight control computer (or from a redundant flight control computer that has assumed the responsibility of flight control) can be considered to determine if the rate of deviation is within an expected tolerance range. If it is determined that the active flight controller is not operating as expected, a failure condition can be established and a notification is generated and one of the device boards 102 assumes the role of active flight controller, as discussed further below.

Figure 1B:
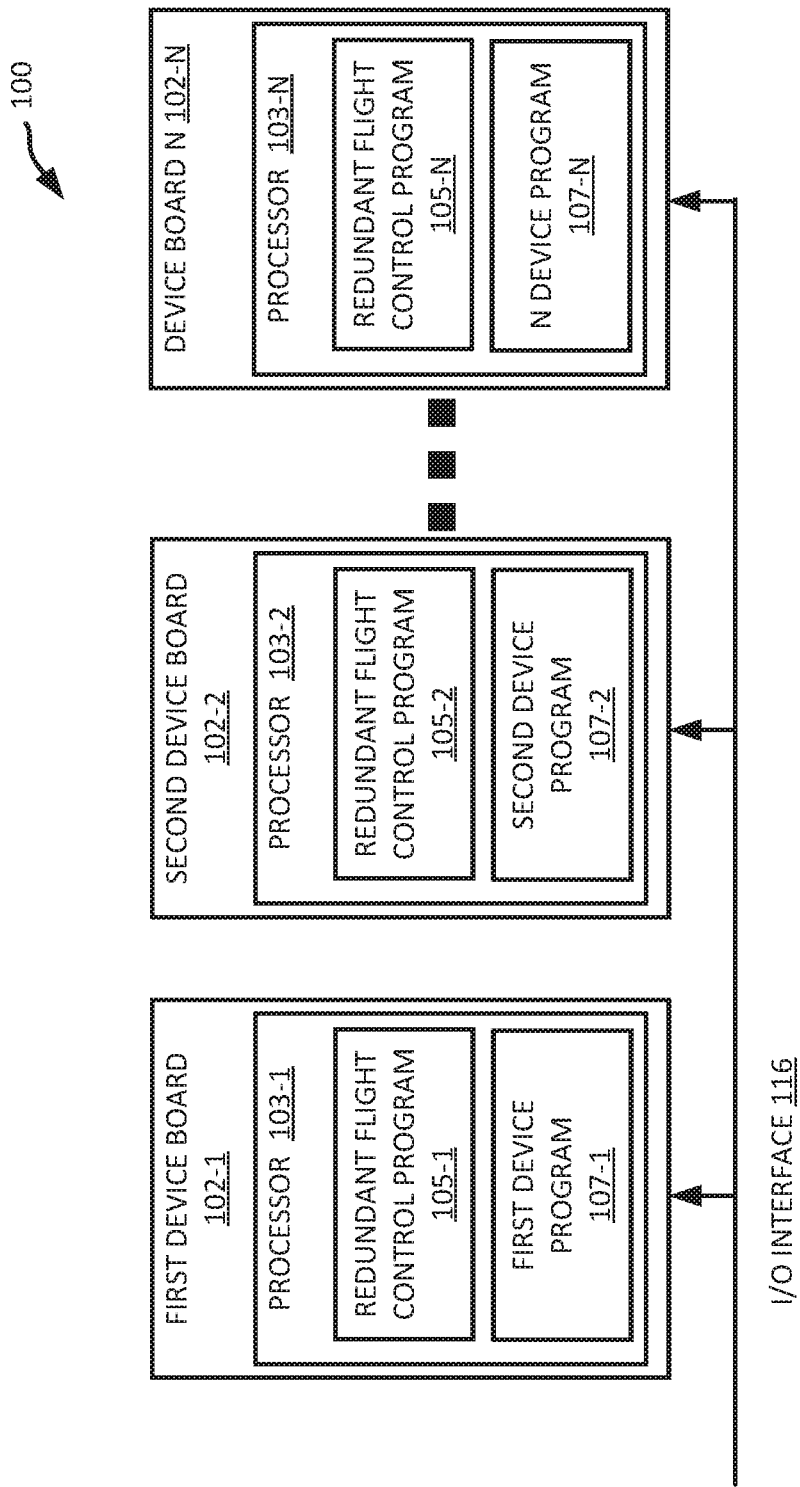
FIG. 1B is a block diagram of an input/output interface and multiple device boards with redundant flight control programs, in accordance with described implementations.

FIG. 1B illustrates another configuration in which the main flight controller board 112 illustrated in FIG. 1A is omitted from the aerial vehicle, in accordance with described implementations. In such an implementation, one of the redundant flight control programs executing on a processor of a device board will always function as the active flight control program. For example, at aerial vehicle startup and/or before a flight, one of the redundant flight control programs assumes the role of active flight controller. In such a configuration, the other device boards and/or redundant flight control programs function as if the active flight control program is the main flight controller.

In the configuration illustrated in FIG. 1B, each of the first device board 102-1, 102-2, through 102-N may have the same configuration, structure, and operation as described above with respect to FIG. 1A and each may communicate via the I/O interface, as discussed above with respect to FIG. 1A. In comparison to FIG. 1A, the aerial vehicle does not include a main flight control board 112. For each flight of the aerial vehicle, one of the redundant flight control programs 105-1, 105-2, through 105-N is selected as the active flight controller. Selection may be the same for each flight, unless the selected redundant flight control program becomes inoperable. In other examples, selection may be randomly performed, may be based on a rotating order or pattern, etc.

Regardless of how and which redundant flight control program is selected as the active flight control program, the other redundant flight control program functions according to the other implementations discussed herein as if the active flight control program were the main flight controller.

Figure 2:
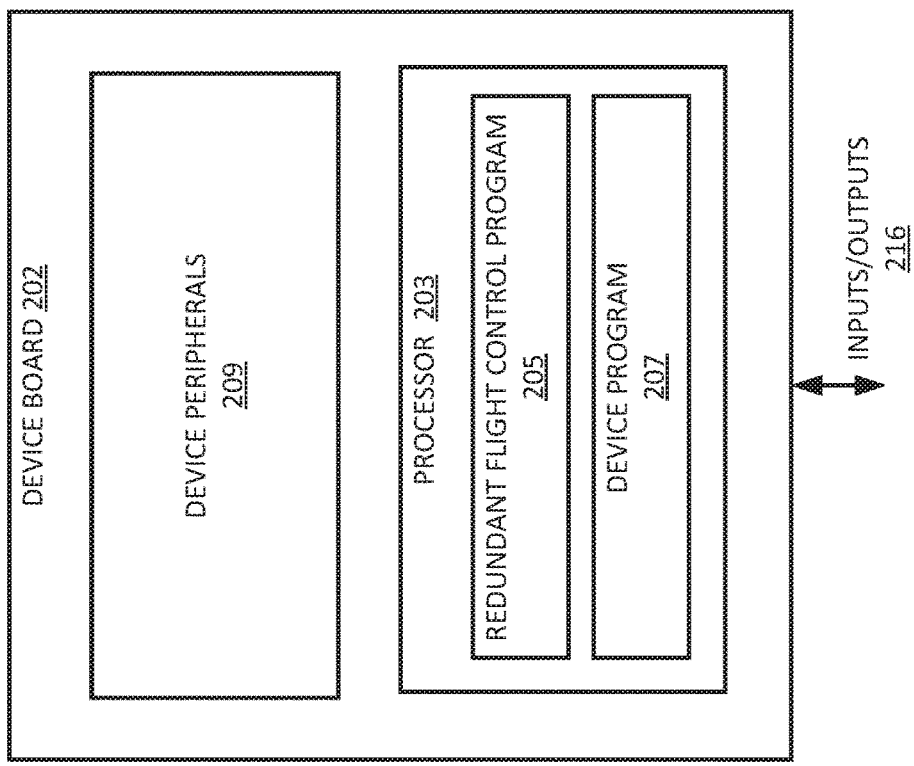
FIG. 2 is a block diagram of a device board, in accordance with described implementations.

FIG. 2 is a block diagram of a device board 202, in accordance with described implementations. In this example, the device board 202 includes a processor 203 that stores and is operable to execute each of device program 207 and redundant flight control program 205. In some implementations, the processor 203 may be a single core processor and each of the device program 207 and redundant flight control program may be executed on the same core. In other implementations, the processor 203 may be multi-core (two or more) processor and the device program 207 may execute on a first core and the redundant flight control program 205 may execute independently on a second core 205.

In addition, each device board 202 generally includes one or more device peripherals 209 that are specific to the function of the device board. Device peripherals include, but are not limited to, magnetometers, gyroscopes, range finders, barometers, altimeters, etc.

As discussed, the device board 202 is coupled to and communicates with other device boards and the flight controller via an I/O interface and receive inputs and outputs 216 from the I/O interface. In some implementations, the processor 203 of the device board may monitor synchronization messages received from the active flight controller to confirm that the flight controller is operable, as discussed further below. In another implementation, the timing of flight control instructions (e.g., silence from the flight controller and/or mis-timed instructions) can be monitored to determine a failure condition of the flight controller. In other implementations, the processor 203 may execute the redundant flight control program 205, receive inputs 216 (e.g., an anticipated flight plan), and the redundant flight control program may independently compute a flight control instruction based on those inputs. The computed flight control instruction may then be compared with a flight control instruction received from the active flight controller and a determination made as to whether the difference is within an expected tolerance range, as discussed further below.

In a similar manner, the device program 207 may also receive the flight control instructions generated by the active flight controller and/or receive inputs from the device peripherals and/or send output to one or more device peripherals. Operation of the device program 205 may be independent of operation of the redundant flight control program, even though they are both executing on the same processor 203.

Figure 3:
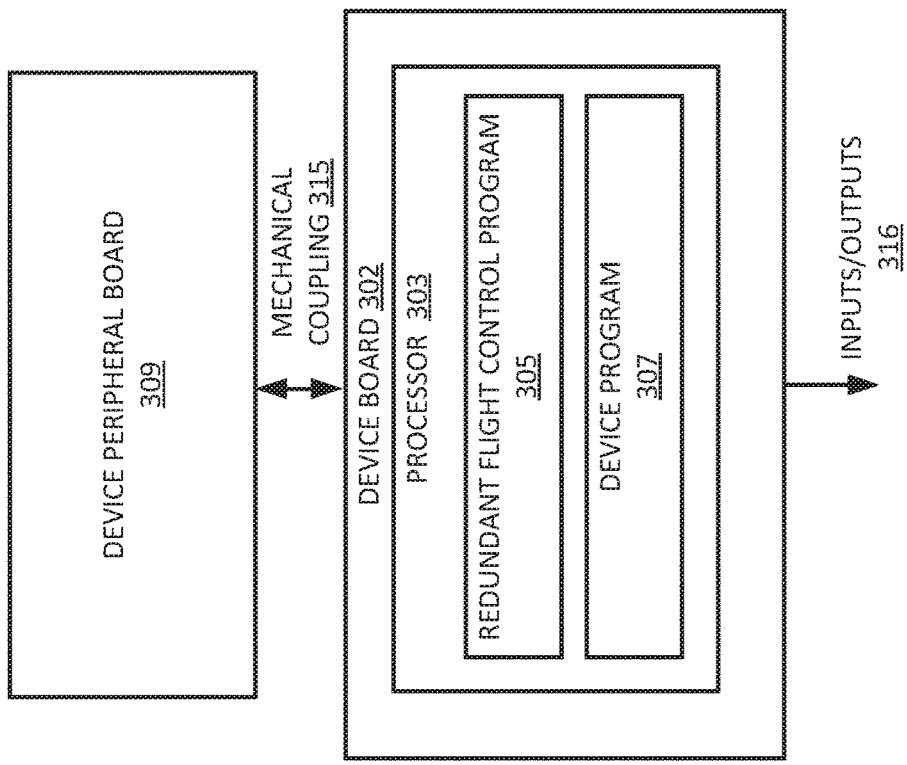
FIG. 3 is a block diagram of a device board with a mechanically coupled peripheral board, in accordance with described implementations.

FIG. 3 is a block diagram of a device board 302 with a mechanically coupled peripheral board 309, in accordance with described implementations. In this example, the function of the device board 302 and mechanically coupled peripheral board 309 may be the same as the device board 202 discussed above with respect to FIG. 2. However, in the implementation discussed with respect to FIG. 3, the device peripherals, which are specific for different types of device boards are separate from the device board 302. In such an example, the physical hardware of the device board, such as the processor 303, may be common to all device boards and loaded with a different device program 307 for different types of device board peripherals and functions. As such, the device board can be fabricated at a lower cost and used for any type of device board by mechanically coupling the device board 302 to any type of device peripheral board 309 and loading the appropriate device program 307 onto the processor 303 of the device board 302. The configuration illustrated in FIG. 3 lowers the cost of device board fabrication because the device board is generic.

Figure 4:
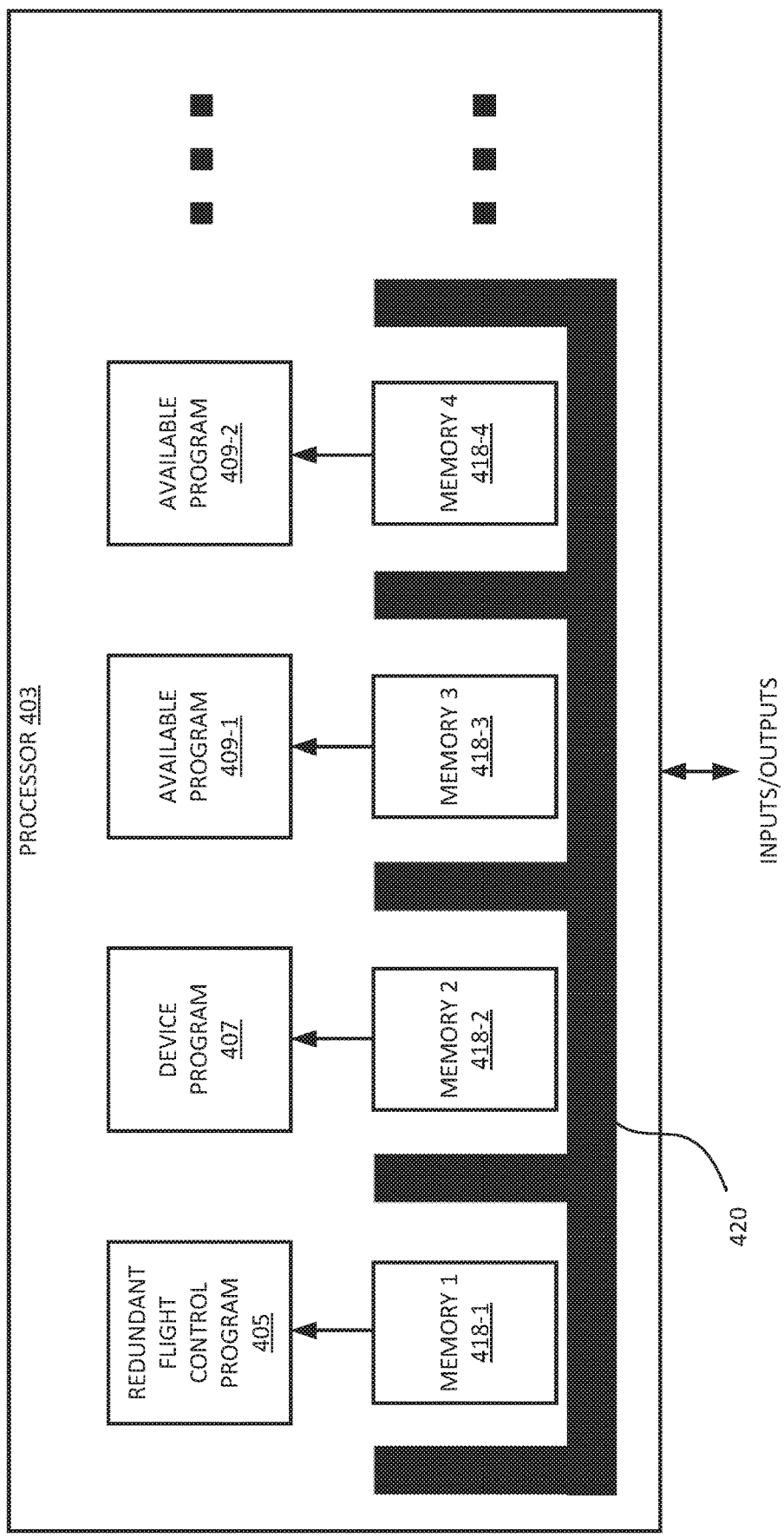
FIG. 4 is a block diagram of a device board processor and memory interface, in accordance with described implementations.

FIG. 4 is a block diagram of a processor 403 of a device board, in accordance with described implementations. As discussed above, the processor may include and be operable to execute the redundant flight control program 405 and the device program 407 of the device board. In addition, in some implementations, the processor 403 may include additional or available compute or programs, such as available program 409-1 and 409-2. The available program, in some implementations, may be used by the main flight controller of the aerial vehicle and/or by other device programs of other device boards to perform compute on their behalf. For example, if a processor of another device board is approaching 100% utilization, some of the compute requirements of the processor for that device board may be offloaded to the processor 403 as available program 409-1 or 409-2. In other implementations, in-flight simulation, error estimations, etc., may be executed by the available programs 409 to simulate different flight behavior under expected flight conditions that may be encountered along a flight path. As will be appreciated, any of a variety of processing may be performed with the available programs 409.

In addition, as illustrated in FIG. 4, the processor 403 may include one or more segments of dedicated processor memory 418, also known as cache memory. In other implementations, the dedicated memory may be memory that is separate from the processor 403, such as a separate cache memory, random access memory (RAM), etc. In the illustrated implementation, the memory 418 is separated by a partition 420 so that each of the device program 407, redundant flight control program 405, and/or available programs 409-1, 409-2 is maintained in and can only access its own segment of memory 418. By partitioning the memory, a memory error will only affect one of the programs executing on the processor 403.

In the illustrated example, the redundant flight control program is associated with a first memory 418-1, the device program 407 is associated with a second memory 418-2, the available program 409-1 is associated with a third memory 418-3, and the available program 409-2 is associated with a fourth memory 418-4. As discussed above, the processor 403 may include and/or execute additional or fewer programs and the ones discussed with respect to FIG. 4 are provided as examples only. Additionally, while FIG. 4 illustrates two available programs 409-1, 409-2, in other implementations more or fewer available programs 409 may be usable on the processor of a device board. In some implementations, there may be no option for available programs 409.

The allocated memory may be used by the respective program to process received inputs and determine outputs. Likewise, the memory 418-1 may be used to store health information regarding the active flight controller, and/or information (e.g., alert notifications) received from other redundant flight control programs executing on processors of other device boards.

In implementations in which the processor 403 is a multi-core processor, the memory may be integrated into the processor 403 and internally partitioned and associated with respective cores of the processor 403.

Figure 5:
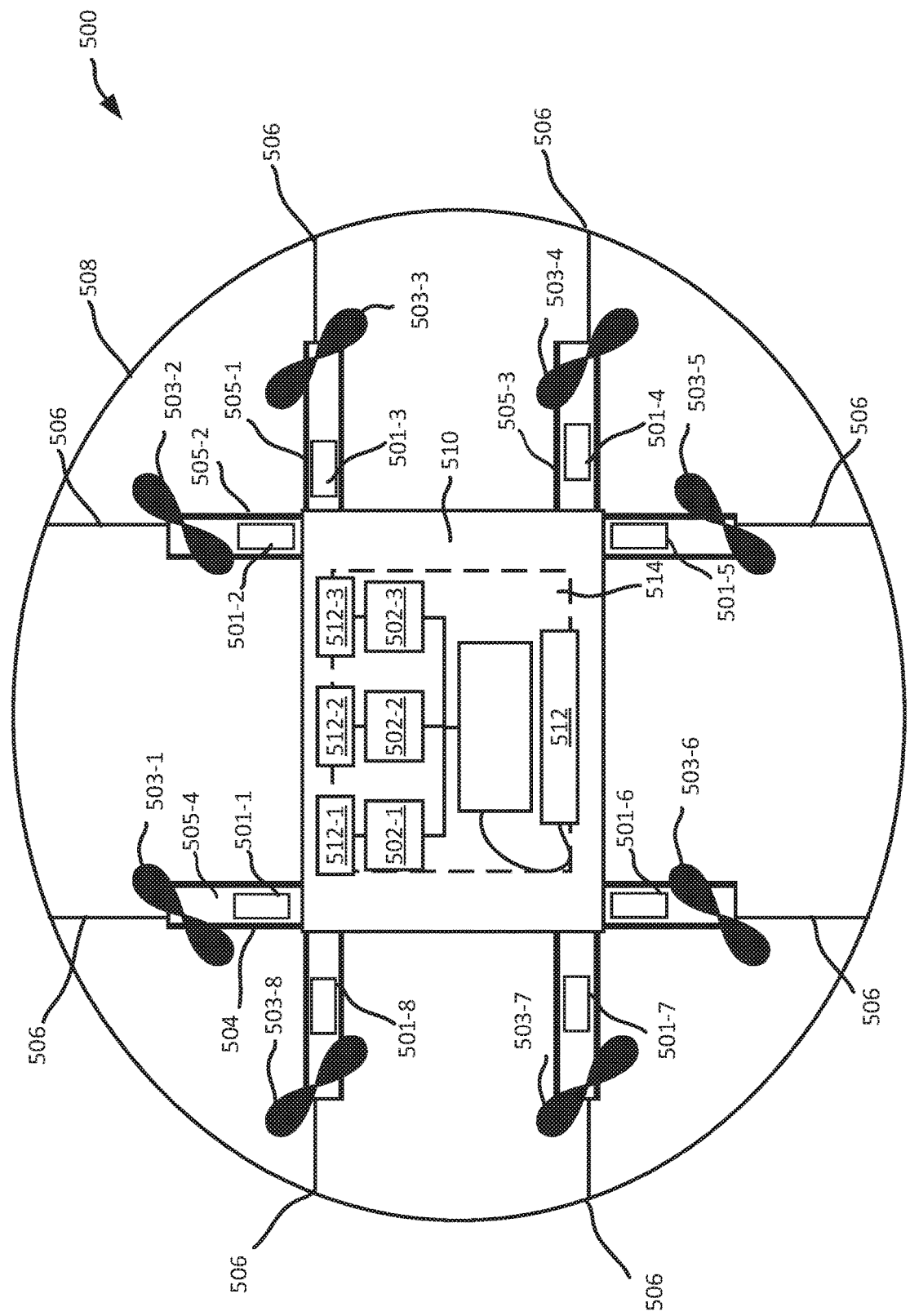
FIG. 5 is a block diagram of an example unmanned aerial vehicle, in accordance with described implementations.

FIG. 5 illustrates a block diagram of a top-down view of an aerial vehicle, in this example a UAV 500, according to an implementation. As illustrated, the UAV 500 includes eight propellers 503-1, 503-2, 503-3, 503-4, 503-5, 503-6, 503-7, 503-8 spaced about the frame 504 of the UAV. The propellers 503 may be any form of propeller (e.g., graphite, carbon fiber) and of a size sufficient to lift the UAV 500 and any inventory engaged by the UAV 500 so that the UAV 500 can navigate through the air to deliver the item(s) to a delivery location. As shown in FIG. 5, each of the eight propellers 503-1, 503-2, 503-3, 503-4, 503-5, 503-6, 503-7, 503-8 can include its own respective control processor 501-1, 501-2, 501-3, 501-4, 501-5, 501-6, 501-7, and 501-8. Although control processors 501-1, 501-2, 501-3, 501-4, 501-5, 501-6, 501-7, and 501-8 are shown being disposed proximate to its respective propeller, alternatively, control processors 501-1, 501-2, 501-3, 501-4, 501-5, 501-6, 501-7, and 501-8 can be part of UAV control system 510. While this example includes eight propellers, in other implementations, more or fewer propellers may be utilized. Likewise, in some implementations, the propellers may be positioned at different locations on the UAV 500. In addition, alternative methods of propulsion may be utilized as "motors" in implementations described herein. For example, fans, jets, turbojets, turbo fans, jet engines, internal combustion engines, and the like may be used (either with propellers or other devices) to propel the UAV.

The frame 504 of the UAV 500 may likewise be of any suitable material, such as graphite, carbon fiber and/or aluminum. In this example, the frame 504 of the UAV 500 includes four rigid members 505-1, 505-2, 505-3, 505-4, or beams arranged in a hash pattern with the rigid members intersecting and joined at approximately perpendicular angles. In this example, rigid members 505-1 and 505-3 are arranged substantially parallel to one another and are approximately the same length. Rigid members 505-2 and 505-4 are arranged substantially parallel to one another, yet perpendicular to rigid members 505-1 and 505-3. Rigid members 505-2 and 505-4 are approximately the same length. In some embodiments, all of the rigid members 505 may be of approximately the same length, while in other implementations, some or all of the rigid members may be of different lengths. Likewise, the spacing and/or orientation between the two sets of rigid members may be approximately the same or different.

While the implementation illustrated in FIG. 5 includes four rigid members 505 that are joined to form the frame 504, in other implementations, there may be fewer or more components to the frame 504. For example, rather than four rigid members, in other implementations, the frame 504 of the UAV 500 may be configured to include six rigid members. In such an example, two of the rigid members 505-2, 505-4 may be positioned parallel to one another. Rigid members 505-1, 505-3 and two additional rigid members on either side of rigid members 505-1, 505-3 may all be positioned parallel to one another and perpendicular to rigid members 505-2, 505-4. With additional rigid members, additional cavities with rigid members on all four sides may be formed by the frame 504. As discussed further below, a cavity within the frame 504 may be configured to include an inventory engagement mechanism for the engagement, transport and delivery of item(s) and/or containers that contain item(s).

In some implementations, the UAV may be configured to reduce aerodynamic resistance. For example, an aerodynamic housing may be included on the UAV that encloses the UAV control system 510, one or more of the rigid members 505, the frame 504 and/or other components of the UAV 500. The housing may be made of any suitable material(s) such as graphite, carbon fiber, aluminum, titanium, magnesium, fiberglass, etc. Likewise, in some implementations, the location and/or the shape of the inventory (e.g., item or container) may be aerodynamically designed. For example, in some implementations, the inventory engagement mechanism 514 may be configured such that when the inventory is engaged it is enclosed within the frame and/or housing of the UAV 500 so that no additional drag is created during transport of the inventory by the UAV 500. In other implementations, the inventory may be shaped to reduce drag and provide a more aerodynamic design of the UAV and the inventory. For example, if the inventory is a container and a portion of the container extends below the UAV when engaged, the exposed portion of the container may have a curved shape.

The propellers 503 and corresponding propeller motors, or other form of propulsion, generally referred to herein as propulsion mechanisms, are positioned at both ends of each rigid member 505. The propeller motors may be any form of motor capable of generating enough speed with the propellers to lift the UAV 500 and any engaged inventory thereby enabling aerial transport of the inventory.

Extending outward from each rigid member is a support arm 506 that is connected to a safety barrier 508. In this example, the safety barrier is positioned around and attached to the UAV 500 in such a manner that the motors and propellers 503 are within the perimeter of the safety barrier 508. The safety barrier may be plastic, rubber, etc. Likewise, depending on the length of the support arms 506 and/or the length, number or positioning of the rigid members 505, the safety barrier may be round, oval, or any other shape.

Mounted to the frame 504 is the UAV control system 510. In this example, the UAV control system 510 is mounted in the middle and on top of the frame 504. The UAV control system 510, as discussed in further detail below with respect to FIG. 9, controls the operation, routing, navigation, communication and the inventory engagement mechanism of the UAV 500.

Likewise, the UAV 500 includes one or more power modules 512. In this example, the UAV 500 includes a power module 512 that are removably mounted to the frame 504 and configured to provide power to components of the UAV control system and/or other components of the aerial vehicle. In addition, the independent device boards 502-1, 502-2, and 502-3, which are part of the UAV control system 510 but illustrated herein for discussion purposes, may also each be coupled to independent power supplies 512-1, 512-2, and 512-3, respectively. By individually powering each device board, a power failure of one power supply will not affect the power provided to the other device boards 502. For example, if power supply 512-1 fails it will render device board 502-1 inoperable but will not impact the operation of device boards 502-2 or 502-3.

The power module(s) for the UAV may be in the form of battery power, solar power, gas power, super capacitor, fuel cell, alternative power generation source, or a combination thereof. For example, the power modules 512 may each be Lithium Polymer (lipo) batteries.

In some implementations, one or more of the power modules may be configured such that it can be autonomously removed and/or replaced with another power module while the UAV is landed. For example, when the UAV lands at a location, the UAV may engage with a charging member at the location that will recharge the power module. In some implementations, a container may include a power module and when the engagement mechanism of the UAV engages with the container, the power module of the container may provide power to the UAV. For example, when an item is being delivered to a delivery location, the power module included in the container may be utilized to power the UAV, rather than and/or in addition to the power modules 512 of the UAV 500. When the container is disengaged, the power provided by the container is removed and the UAV 500 operates using power from the UAV power modules 512.

As mentioned above, the UAV 500 also includes an inventory engagement mechanism 514. The inventory engagement mechanism may be configured to engage and disengage items and/or containers that hold items. In this example, the inventory engagement mechanism 514 is positioned within a cavity of the frame 504 that is formed by the intersections of the rigid members 505. In this example, the inventory engagement mechanism 514 is positioned beneath the UAV control system 510. In implementations with additional rigid members, the UAV may include additional inventory engagement mechanisms and/or the inventory engagement mechanism 514 may be positioned in a different cavity within the frame 504. The inventory engagement mechanism may be of any size sufficient to securely engage and disengage containers that contain inventory. In other implementations, the engagement mechanism may operate as the container, containing the inventory item(s) to be delivered. The inventory engagement mechanism communicates with (via wired or wireless communication) and is controlled by the UAV control system 510.

While the implementations of the UAV discussed herein utilize propellers to achieve and maintain flight, in other implementations, the UAV may be configured in other manners. For example, the UAV may include fixed wings and/or a combination of both propellers and fixed wings. For example, the UAV may utilize one or more propellers to enable takeoff and landing and a fixed wing configuration or a combination wing and propeller configuration to sustain flight while the UAV is airborne.

Figure 6:
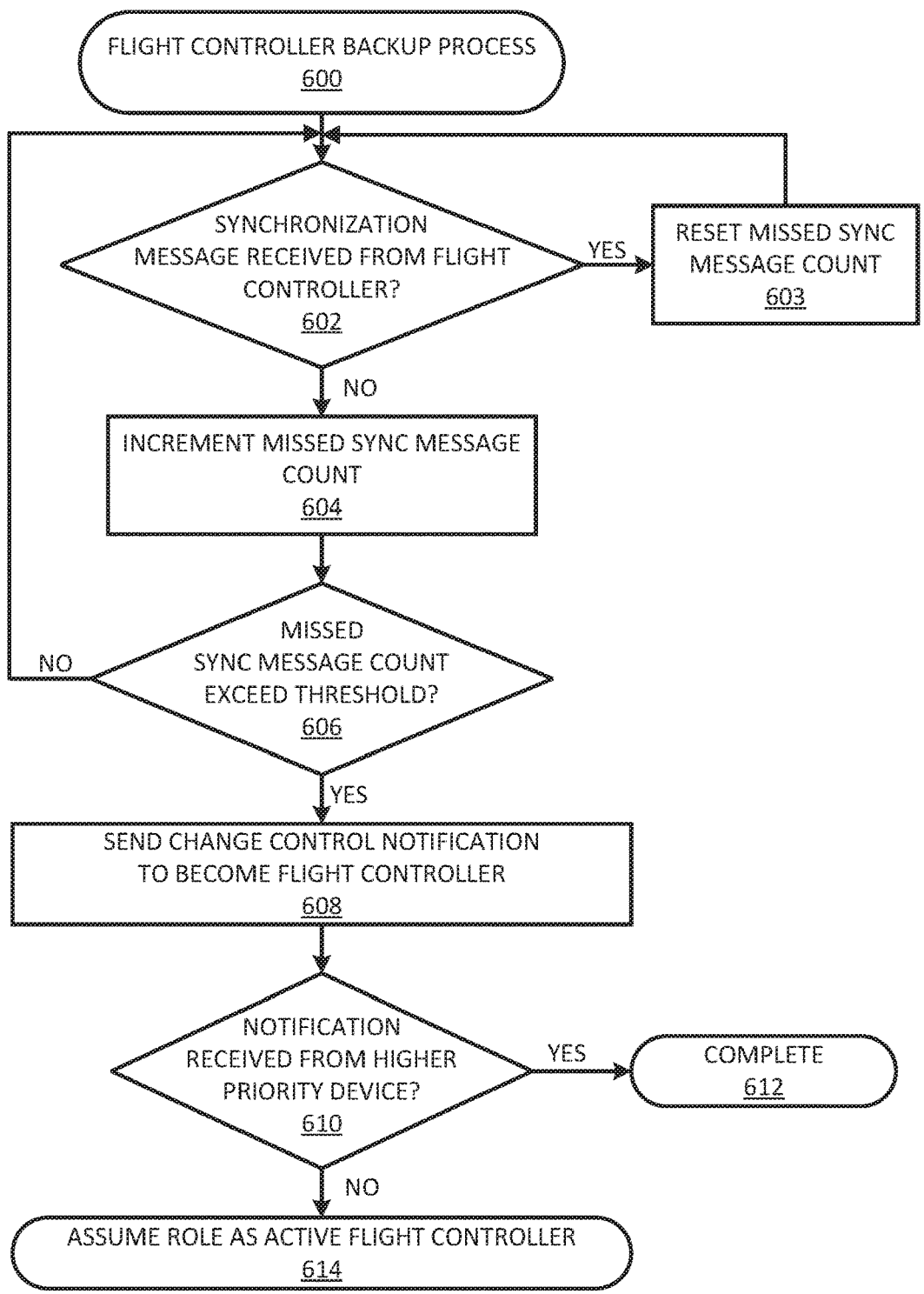
FIG. 6 illustrates a flow diagram of an example flight controller backup process, in accordance with described implementations.

FIG. 6 illustrates a flow diagram of an example flight controller backup process 600, in accordance with described implementations. The example process may be performed by one or more device boards during operation of an aerial vehicle. The example process begins by determining if a synchronization message has been received from the active flight controller, as in 602. As discussed above, the active flight controller (i.e., the main flight controller or a redundant flight control program that has assumed responsibility of flight control) sends at defined time intervals synchronization messages on the I/O interface. According to certain implementations, the synchronization message may not be a separate transmission but may be included in the flight control instructions (or may be flight control instructions themselves) that the active flight controller sends to the device boards. The synchronization messages may be used by different device boards to initiate different functions or to align the clock timing of device boards of the aerial vehicle, etc. In some implementations, the synchronization messages are sent by the active flight control program at 100 Hz. If it is determined that the synchronization message has been received, a missed synchronization count is reset, and the example process returns to block 602 and continues, as in 603. Alternatively and/or in addition, the timing of such synchronization messages can be monitored to ensure that the timing at which they are being received is proper (e.g., relative to a system clock). As discussed below, the synchronization count may be a count indicating the consecutive number of times the synchronization message was not received or at an improper timing interval.

If it is determined that that the synchronization message has not been received (or at an improper timing interval), the missed synchronization count is incremented to reflect the missed synchronization message, as in 604. A determination is then made as to whether the missed synchronization message count exceeds a threshold, as in 606. The threshold may be any number and may vary by device board/redundant flight control program, by location of the aerial vehicle, etc. In some implementations, the threshold may be zero such that it will be decided that the missed synchronization message count exceeds the threshold once a first synchronization message is not received by the device controller. In other implementations, the missed synchronization message count may be greater than one.

If it is determined that the missed synchronization message count does not exceed the threshold, the example process returns to block 602 and continues. If it is determined that the missed synchronization message count does exceed the threshold, a change control notification is generated by the device controller and sent to other device controllers of the aerial vehicle, as in 608. As discussed above, the change control notification is a notification indicating that the redundant flight control program executing on a device board is requesting to assume the role as active flight controller for the aerial vehicle.

Subsequent to sending the change control notification, a determination is made as to whether a change control notification has been received at the device board/redundant flight control program from another device board/redundant flight control program that has a higher priority, as in 610. For example, the header of each data packet may include a device board identifier and the device board identifier with a lower number may be identified as a device board having a higher priority.

If it is determined that a change control notification has been received from another device board/redundant flight control program with a higher priority, the device board/ redundant flight control program does not become the active flight controller and instead begins receiving flight control instructions from the new active flight controller, as indicted in the received change control notification.

However, if it is determined that a change control notification has not been received from another device board/redundant flight control program, the redundant flight program executing on the processor of the device board assumes the role as active flight controller, as in 614. In some implementations, the redundant flight controller may operate as a fully functioning flight controller and continue aerial navigation of the vehicle. In other implementations, the redundant flight control program may have limited capacity to process information and to safely land the aerial vehicle at a nearby location.

Figure 7:
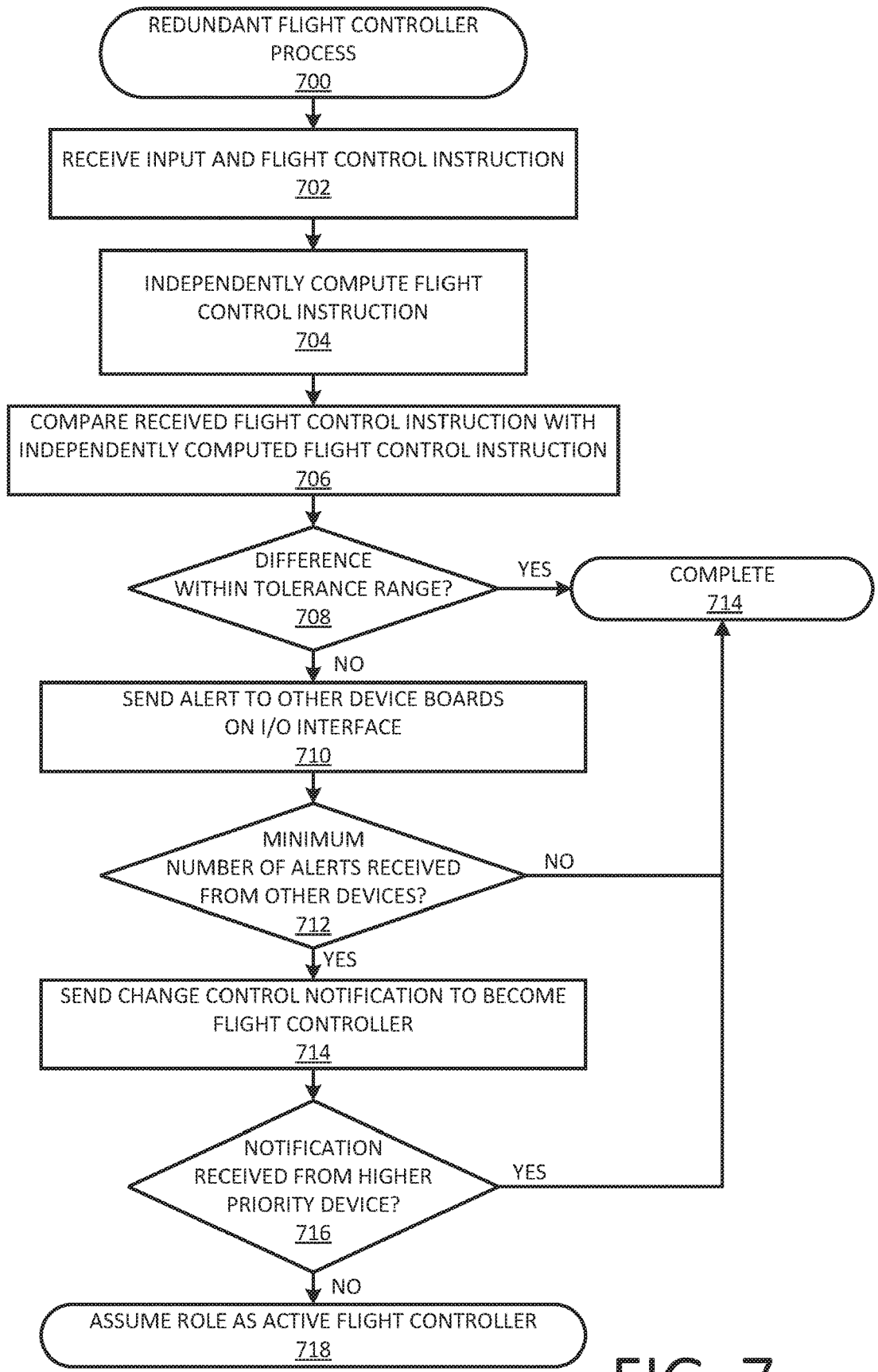
FIG. 7 illustrates a flow diagram of an example redundant flight controller process, in accordance with described implementations.

FIG. 7 illustrates a flow diagram of an example redundant flight controller process 700, in accordance with described implementations. The example process 700 may be performed in addition to or as an alternative to the example process 600 and during flight operation. Likewise, the example process 700 may be performed by one or more of the independent redundant flight control programs operating on a processor of a device board of the aerial vehicle, as discussed above.

The example process 700 begins by receiving input from one or more aerial vehicle components and flight control instructions corresponding to those inputs, as in 702. The inputs can include, for example, an anticipated flight plan. The inputs and the flight control instructions may be received at different times. For example, the inputs may be received at an initial time when transmitted across the I/O interface to the active flight controller and the flight control instructions may be received at a second, subsequent time after the active flight controller has processed the inputs and generated the flight control instructions.

Upon receipt of the inputs from one or more components of the aerial vehicle, the example process 700, executed by one of the redundant flight control programs, independently computes flight control instructions based on the received inputs, as in 704. The flight control instructions may be any instructions that are to be sent to one or more device boards to control operation of the aerial vehicle. For example, flight control instructions may include, but are not limited to, motor speed controls, servo messaging/positioning, landing gear retract/extend instructions, actuator instructions, etc.

The independently computed flight control instruction is then compared with the flight control instruction received from the active flight controller, as in 706. Comparison may include comparing instruction values between the two instructions and/or any other quantitively comparable component(s) of the instructions. A determination is then made as to whether the comparison is within a tolerance range, as in 708. Alternatively, the comparison can be performed over a period of time and a determination can be made if a rate of change of the comparison is accelerating, and if the rate of change is within a tolerance range. The tolerance range may vary for control instruction type, aerial vehicle location, weather conditions, etc. The tolerance range may be, for example, a degree of difference between the two instructions. For example, the tolerance rage may be 5% and if the difference between the flight control instruction received from the active flight controller and the flight control instruction independently computed by the redundant flight control processor exceeds 5% it is determined that the difference exceeds the tolerance range. If the difference is less than or equal to 5%, it is determined that the difference is within the tolerance range. As will be appreciated, the tolerance range may be any value and 5% is provided only as an example.

If it is determined that the difference between the two instructions (or a rate of change of the comparison) is within the tolerance range, the example process 700 completes, as in 714. If it is determined that the difference exceeds the tolerance range, an alert is sent to other device boards on the I/O interface, as in 710. The alert may be any form of notification indicating that the difference between the received flight control instruction and the computed flight control instruction exceeds an expected tolerance range.

Subsequent to sending the alert, a determination is made as to whether a minimum number of alerts have been received from other device boards on the I/O interface, as in 712. The minimum number may be any defined amount. In some examples, the minimum number may be zero such that generation of an alert by the redundant flight control processor may be sufficient. In other implementations, the minimum number may be greater than zero.

If it is determined that the minimum number has not been received, the example process 700 completes, as in 714. If it is determined that the minimum number has been received, a change control notification is generated by the redundant flight control program and sent to other device boards/redundant flight control programs of the aerial vehicle, as in 714. As discussed above, the change control notification is a notification indicating that the redundant flight control program is requesting to assume the role of active flight controller for the aerial vehicle.

Subsequent to sending the change control notification, a determination is made as to whether a change control notification has been received at the device board/redundant flight control program from another device board/redundant flight control program that has a higher priority, as in 716. For example, the header of each data packet may include a device board identifier and the device board identifier with a lower number may be identified as a device board having a higher priority.

If it is determined that a change control notification has been received from another device board/redundant flight control program with a higher priority, the redundant flight program does not become the active flight controller and instead begins receiving flight control instructions from the new active flight controller, as indicated in the received change control notification.

However, if it is determined that a change control notification has not been received, the redundant flight program executing on the processor of the device board assumes the role of active flight controller, as in 718. In some implementations, the redundant flight controller may operate as a fully functioning flight controller and continue aerial navigation of the vehicle. In other implementations, the redundant flight controller may have limited capacity to process information and to safely land the aerial vehicle at a nearby location.

Figure 8:
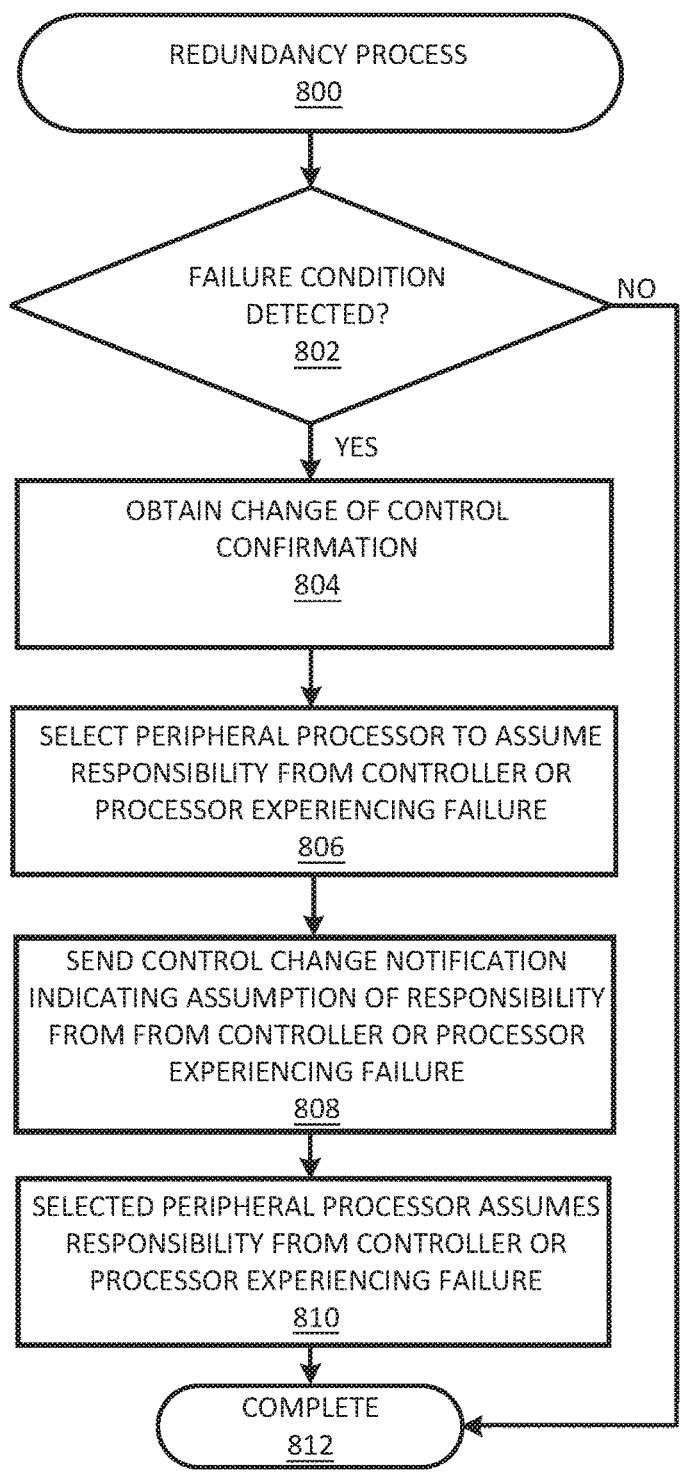
FIG. 8 illustrates a flow diagram of an example redundancy process, in accordance with described implementations.

FIG. 8 illustrates a flow diagram of an example redundancy process 800 in accordance with described implementations. The example process 800 may be performed in addition to or as an alternative to the example process 600 or 700 and during flight operation. Likewise, the example process 800 may be performed by one or more of the independent redundant flight control programs operating on a processor of a device board of the aerial vehicle, as discussed above.

The example process 800 begins in step 802 by determining whether a failure condition has been determined for any controller, processor, or system (e.g., flight controller 112, the navigational system, etc.) of the flight control system (e.g., aerial vehicle control system 900). As described herein, a failure condition can include, for example, missed synchronization messages, silence from the controller or processor, mis-timed flight control instructions from the controller or processor, deviation from computed expected flight control instructions, etc.

In the event that a failure condition has been detected, a change of control confirmation can be obtained (step 804). The change of control confirmation can include, for example, an instruction sent to each of the device boards to poll each of the device boards to obtain a consensus or an agreement among the device boards that the flight controller should no longer maintain the responsibility of the flight controller and one of the device boards/processors should assume the role of the flight controller. As described herein, this can include a majority, a super majority, a unanimous vote of the device boards that one of the device boards should assume the role of the main flight controller from the flight controller. After the change of control confirmation has been obtained, the peripheral processor to assume responsibility of the role performed by controller or processor experiencing the failure is selected in step 806. As described herein, this can include selecting the peripheral processor with the highest priority, which may be predetermined or dynamically determined.

Next, a change control notification is generated by the redundant flight control program and sent to other device boards/redundant flight control programs of the aerial vehicle, as in 808. As discussed above, the change control notification is a notification indicating that the redundant flight control program is requesting to assume responsibility of the role performed by controller or processor experiencing the failure for the aerial vehicle. Subsequently, the redundant flight program executing on the processor of the device board assumes the responsibility of the role performed by controller or processor experiencing the failure, as in 810. In some implementations, the redundant flight controller may operate as a fully functioning flight controller and continue aerial navigation of the vehicle. In other implementations, the redundant flight controller may have limited flight control instructions. For example, the limited flight control instructions can provide for safely landing the aerial vehicle at a nearby location, returning to its origin, pulling up and attempting a reset of the main flight controller, etc.

Figure 9:
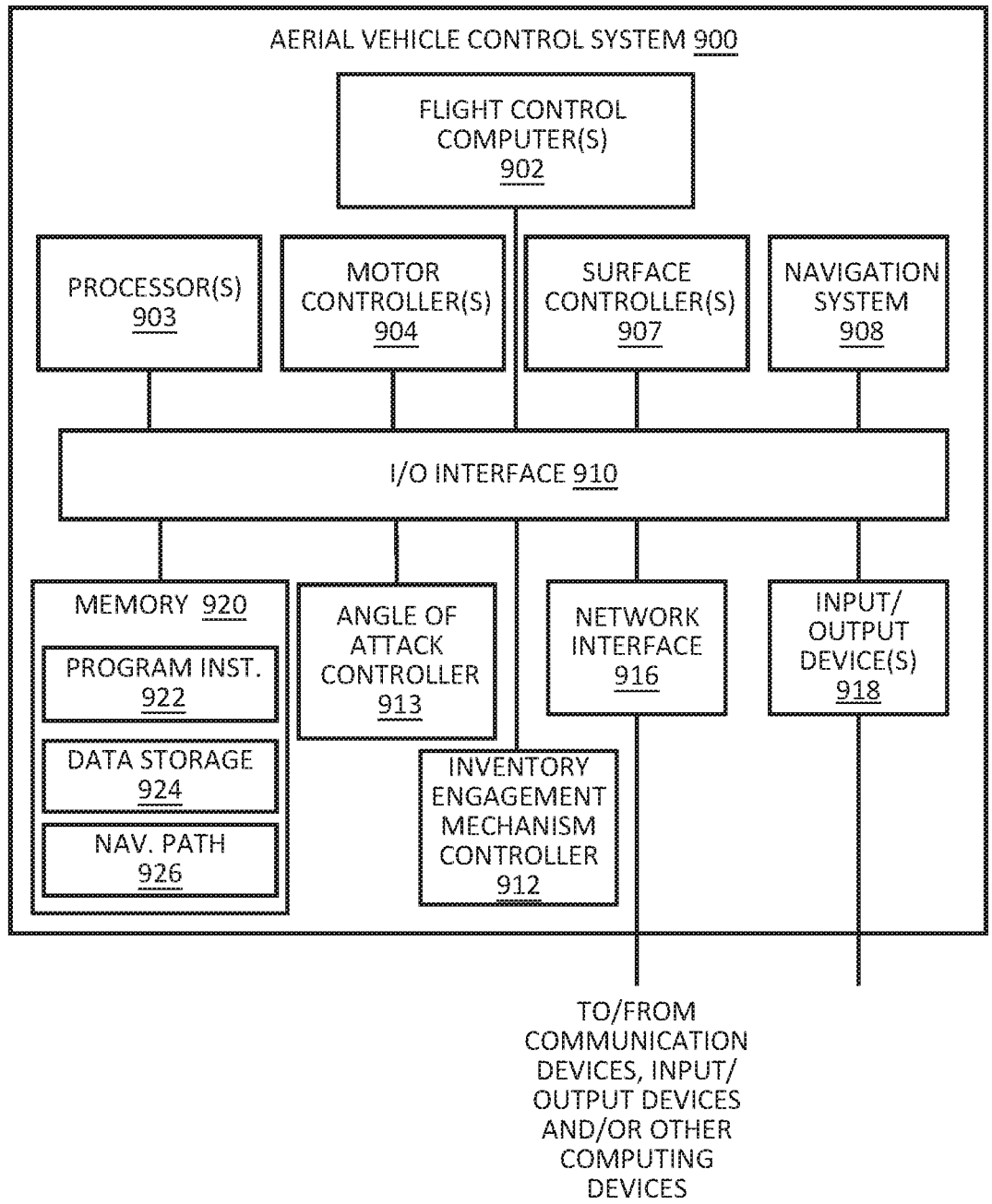
FIG. 9 illustrates an example aerial vehicle control system, in accordance with described implementations.

FIG. 9 is a block diagram illustrating an example aerial vehicle control system 900, according to disclosed implementations. In various examples, the block diagram may be illustrative of one or more aspects of the aerial vehicle control system 900 that may be used to implement the various systems and methods discussed above. In the illustrated implementation, the aerial vehicle control system 900 includes one or more redundant flight control computers 902, such as those discussed above, and one or more processors 903, coupled to a non-transitory computer readable storage medium 920 via an input/output (I/O) interface 910. The aerial vehicle control system 900 may also include a motor controller device board 904, such as an electronic speed control (ESC), a surface (or actuator) controller device board 907, a navigation system controller device board 908, an angle of attack controller device board 913, an inventory engagement mechanism controller device board 912, a network interface 916, and one or more input/output devices 918. As discussed above, each of the device boards may include a processor that executes, or is configured to execute, both the corresponding device program and a redundant flight control program.

In various implementations, the aerial vehicle control system 900 may be a uniprocessor system including one processor 903, or a multiprocessor system including several processors 903 (e.g., two, four, eight, or another suitable number). The processor(s) 903 may be any suitable processor capable of executing instructions. For example, in various implementations, the processor(s) 903 may be general-purpose or embedded processors implementing any of a variety of instruction set architectures (ISAs), such as the x86, PowerPC, ARM, SPARC, or MIPS ISAs, or any other suitable ISA. In multiprocessor systems, each processor(s) 903 may commonly, but not necessarily, implement the same ISA. The processors of the flight controller and/or the device boards may likewise be of any type processor.

The non-transitory computer readable storage medium 920 may be configured to store executable instructions, data, navigation paths and/or data items accessible by the processor(s) 903. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 920 as program instructions 922, data storage 924 and navigation path data 926, respectively. In other implementations, program instructions, data and/or navigation paths may be received, sent or stored upon different types of computer-accessible media, such as non-transitory media, or on similar media separate from the non-transitory computer readable storage medium 920 or the aerial vehicle control system 900. Generally speaking, a non-transitory, computer readable storage medium may include storage media or memory media such as magnetic or optical media, e.g., disk or CD/DVD-ROM, coupled to the aerial vehicle control system 900 via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the flight control computer(s) 902, processor(s) 903, device boards, the non-transitory computer readable storage medium 920, and any peripheral devices, the network interface 910 or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 903). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 903.

The motor controller device board 904 communicates with the navigation system 908 and adjusts the power of each motor to guide the aerial vehicle along a determined navigation path. The navigation system device board 908 may include a GPS or other similar system than can be used to navigate the aerial vehicle. The inventory engagement mechanism controller device board 912 communicates with the motor(s) (e.g., a servo motor) used to engage and/or disengage inventory. For example, when the aerial vehicle is positioned over a level surface at a delivery location, the inventory engagement mechanism controller device board 912 may provide an instruction to a motor that controls the inventory engagement mechanism to release the inventory. The angle of attack controller device board 913 may be configured to send instructions to the motors and/or ailerons of wings of the aerial vehicle to control the angle (pitch, yaw, roll) of the aerial vehicle.

The network interface 916 may be configured to allow data to be exchanged between the aerial vehicle control system 900, other devices attached to a network, such as other computer systems, and/or with aerial vehicle control systems of other aerial vehicles. For example, the network interface 916 may enable wireless communication between numerous aerial vehicles that are transporting inventory to various delivery destinations. In various implementations, the network interface 916 may support communication via wireless general data networks, such as a Wi-Fi network. For example, the network interface 916 may support communication via telecommunications networks such as cellular communication networks, satellite networks, and the like.

Input/output devices 918 may, in some implementations, include one or more displays, image capture devices, thermal sensors, infrared sensors, time of flight sensors, accelerometers, pressure sensors, weather sensors, etc. Multiple input/output devices 918 may be present and controlled by the aerial vehicle control system 900. One or more of these sensors may be utilized to assist in the landing as well as avoid obstacles during delivery and/or engagement of inventory. For example, utilizing a location signal from the GPS receiver and one or more IR sensors, the aerial vehicle may safely land on a location designated by the user. The IR sensors may be used to provide real-time data to assist the aerial vehicle in avoiding moving/movable obstacles.

As shown in FIG. 9, the memory 920 may include program instructions 922 which may be configured to implement the example processes and/or sub-processes described above. The data storage 924 may include various data stores for maintaining data items that may be provided for determining navigation paths, retrieving inventory, landing, identifying a level surface for disengaging inventory, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 900 is merely illustrative and is not intended to limit the scope of the present disclosure. The aerial vehicle control system 900 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Although the described implementations, including processes 600, 700, and 800, have been described primarily with respect to providing redundancy for the main flight controller, the described implementations, including processes 600, 700, and 800, are equally applicable to providing redundancy for any controller, processor system, etc. of a flight control system, such as the main flight controller, the navigational system, etc. As described herein, the device boards 102 can also monitor the health of the various controllers, processors, and systems of a flight control system for a failure condition of any of the various controllers, processors, and systems to provide redundancy for these components.

For example, the navigational system (e.g., an inertial measurement unit, etc.) of an aerial vehicle may aggregate and fuse data received from a multitude of sensors (e.g., GPS sensors, triangulation modules, accelerometers, gyroscopes, compasses, etc.) to facilitate determination of navigation information, such as estimations of position, acceleration, yaw, pitch, roll, etc. and other flight control parameters to enable operation of the aerial vehicle. Similar to monitoring the health of the flight controller 112, the device boards 102 can monitor the health of the navigational system. According to certain aspects, the device boards 102 can determine that silence from the navigational system (e.g., not receiving any navigation information from the navigational system) for a period of time that exceeds a certain threshold (e.g., 50 ms, 100 ms, 150 ms, 200 ms, etc.) is a failure condition. The device boards 102 can also monitor the timing of the navigation information and if the navigation information is not received in accordance with a known defined timing sequence (e.g., 100 Hz, 200 Hz, etc.), it can be determined by the device boards 102 that the navigational system is experiencing a failure condition. Alternatively, the device boards 102 may receive navigation information at random timing intervals or at timing intervals that are not synchronized with the expected defined timing sequence of the navigational system. Accordingly, a failure condition of the navigational system can be determined after a number of mis-timed navigation information exceeds a threshold value.

The device boards 102 can also independently verify the navigation information provided by the navigational system. For example, in implementations employing a CAN bus architecture, all the device boards 102 can access navigational and sensor information. The redundant flight control program can independently compute the navigation information based on the sensor data available via the CAN bus and then compare the navigation information provided by the navigational system against the computed navigation information to determine if the difference is within an expected tolerance range. If the difference is within the expected tolerance range, it is confirmed that the navigational system is operating as expected. If the difference is not within the expected tolerance range, it is determined that the navigational system is not operating as expected. Alternatively or in addition, a rate of deviation of the comparison between the computed navigation information with received navigation information from the navigational system can be considered to determine if the rate of deviation is within an expected tolerance range.

In the event that it is determined that the navigational system, or any other controller or processor of the control system is not operating as expected, a failure condition can be established and, as described herein, a notification can be generated and one of the device boards 102 can assume responsibility of the role performed by the controller or processor experiencing the failure.

The data and/or computer executable instructions, programs, firmware, software and the like (also referred to herein as "computer executable" components) described herein may be stored on a computer-readable medium that is within or accessible by computers or computer components such as the computing resources and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, while this disclosure describes implementations with respect to aerial vehicles and determining flight control instructions for aerial vehicles, the disclosed implementations are equally applicable to other forms of vehicles including, but not limited to, ground based vehicles and/or water based vehicles. For example, the implementations disclosed herein may be used as part of a ground based navigation system to determine ground based navigation commands for controlling motors of a ground based vehicle and/or to provide navigation redundancy for ground based systems.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6-9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   determining a failure condition associated with an active main flight controller;
   polling each of a motor control processor, an actuator control processor, and an angle of attack processor to determine that one of the motor control processor, the actuator control processor or the angle of attack processor is to assume responsibility over flight controls from the active main flight controller;
   selecting a redundant flight controller from the motor control processor, the actuator control processor, and the angle of attack processor to assume responsibility over flight controls from the active main flight controller;
   sending a control change notification indicating that the redundant flight controller is to assume responsibility over flight controls from the active main flight controller; and
   sending an instruction to cause the redundant flight controller to assume responsibility over flight controls as a current main flight controller and to execute a redundant flight control program.

2. The computer-implemented method of claim 1, wherein executing the redundant flight control program causes an unmanned aerial vehicle ("UAV") to perform a landing.

3. The computer-implemented method of claim 1, wherein determining the failure condition includes at least one of:
   determining that a flight control instruction has not been received by at least one of the motor control processor or the actuator control processor over a period of time,
   determining that the flight control instruction has been received by at least one of the motor control processor or the actuator control processor at unexpected timing intervals over a period of time, or
   determining that the flight control instruction received by at least one of the motor control processor or the actuator control processor deviates from an anticipated flight plan outside of a tolerance range.

4. The computer-implemented method of claim 1, wherein each of the motor control processor, the angle of attack processor, and the actuator control processor includes a predetermined priority rank.

5. An unmanned aerial vehicle ("UAV") redundant flight control apparatus, comprising:
   a distributed processor network including:
      a flight control system having a plurality of controllers; and
      a plurality of peripheral control processors, a peripheral control program executing on at least one of the plurality of peripheral control processors, the peripheral control program being configured to at least:
         determine a failure condition associated with a main flight controller from the plurality of controllers;
         determine a consensus among the plurality of peripheral control processors that one of the plurality of peripheral control processors is to assume responsibility from the main flight controller;
         select a redundant control processor from the plurality of peripheral control processors to assume responsibility from the main flight controller;
         send a control change notification indicating that the redundant control processor is to assume responsibility from the main flight controller; and
         send an instruction to cause the redundant control processor to execute a second flight control program.

6. The UAV redundant flight control apparatus of claim 5, wherein the second flight control program includes instructions to cause the UAV to perform a landing.

7. The UAV redundant flight control apparatus of claim 5, wherein the plurality of peripheral control processors includes at least one of a motor control processor, an actuator control processor, a landing gear processor, an angle of attack processor, a ground detection processor, or a payload processor.

8. The UAV redundant flight control apparatus of claim 5, wherein determination of the consensus among the plurality of peripheral control processors includes, at least:
   polling each of the plurality of peripheral control processors; and
   obtaining an indication from at least one of a simple majority, a super majority, or unanimity from the plurality of peripheral control processors that one of the plurality of peripheral control processors is to assume responsibility over flight controls from the main flight controller.

9. The UAV redundant flight control apparatus of claim 5, wherein the plurality of controllers includes a navigational system controller.

10. The UAV redundant flight control apparatus of claim 5, wherein each of the plurality of peripheral control processors includes a dynamically assigned priority rank based at least in part on an operating state of each of the plurality of peripheral control processors during a stage of flight.

11. The UAV redundant flight control apparatus of claim 5, wherein the distributed processor network includes a controller area network ("CAN") bus architecture.

12. The UAV redundant flight control apparatus of claim 11, wherein the plurality of peripheral control processors receive an anticipated flight plan over the CAN bus, and determination of the failure condition includes at least one of:
   determining that a flight control instruction has not been received by at least some of the peripheral control processors over a period of time,
   determining that the flight control instruction has been received by at least some of the peripheral control processors at unexpected timing intervals over a period of time, or
   determining that the flight control instruction deviates from the anticipated flight plan.

13. The UAV redundant flight control apparatus of claim 12, wherein determining that the flight control instruction deviates from the anticipated flight plan includes at least one of:
  determining that the flight control instruction includes a first instruction that causes a deviation from the anticipated flight plan to exceed a predetermined threshold; or
  determining that the flight control instruction includes a second instruction that causes a rate of deviation from the anticipated flight plan to exceed a predetermined threshold.

14. The UAV redundant flight control apparatus of claim 5, wherein the peripheral control program is further configured to at least, prior to sending the control change notification, determine that the control change notification was received by each of the plurality of peripheral control processors.

15. The UAV redundant flight control apparatus of claim 5, wherein the peripheral control program is further configured to at least:
  determine a failure condition associated with the redundant control processor;
  determine a consensus among a remaining plurality of peripheral control processors that one of the remaining plurality of peripheral control processors is to assume responsibility over flight controls from the redundant control processor;
  select a second redundant control processor from the remaining plurality of peripheral control processors to assume responsibility over flight controls from the redundant control processor;
  send a second control change notification indicating that the second redundant control processor is to assume responsibility over flight controls from the redundant control processor; and
  send an instruction to cause the second redundant control processor to execute a third flight control program.

16. The UAV redundant flight control apparatus of claim 5, wherein each of the plurality of peripheral control processors includes a memory storing the second flight control program.

17. An aerial vehicle apparatus, comprising:
  a controller area network ("CAN") distributed processor architecture, including:
    a main flight control processor executing a first flight control program; and
    a motor control processor, an actuator control processor, and an angle of attack processor, at least one of the motor control processor, the actuator control processor, and the angle of attack processor executing a peripheral control program,
  wherein the first flight control program is configured to at least:
    generate a first flight control instruction;
    send, at defined time intervals, the first flight control instruction to each of the motor control processor, the actuator control processor, and the angle of attack processor,
  wherein the peripheral control program is configured to at least:
    determine a failure condition associated with the main flight control processor;
    determine a consensus among the motor control processor, the actuator control processor, and the angle of attack processor that one of the motor control processor, the actuator control processor, and the angle of attack processor is to assume responsibility over flight controls from the main flight control processor;
    select a redundant control processor from the motor control processor, the actuator control processor, and the angle of attack processor to assume responsibility over flight controls from the main flight control processor;
    send a control change notification indicating that the redundant control processor is to assume responsibility over flight controls from the main flight control processor; and
    send an instruction to cause the redundant control processor to execute a second flight control program.

18. The aerial vehicle apparatus of claim 17, wherein determination of the failure condition associated with the main flight control processor includes determining that the first flight control instruction was not received over a predetermined period of time.

19. The aerial vehicle apparatus of claim 17, wherein selection of the redundant control processor is based at least in part on a predetermined priority rank associated with each of the motor control processor and the actuator control processor.

* * * * *